US011659513B2

(12) United States Patent
Calio et al.

(10) Patent No.: US 11,659,513 B2
(45) Date of Patent: May 23, 2023

(54) IDENTIFYING UNREGISTERED DEVICES THROUGH WIRELESS BEHAVIOR

(71) Applicant: International Business Machines Corporation, Armonk, NY (US)

(72) Inventors: Robert Joseph Calio, Red Hook, NY (US); Michael Domitrovits, New Paltz, NY (US); Gary T. Leonardi, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/114,651

(22) Filed: Dec. 8, 2020

(65) Prior Publication Data
US 2022/0182965 A1    Jun. 9, 2022

(51) Int. Cl.
*H04W 60/00* (2009.01)
*H04W 60/04* (2009.01)
*H04W 64/00* (2009.01)
*G06N 3/084* (2023.01)
*G06N 3/044* (2023.01)
*G06N 3/045* (2023.01)

(52) U.S. Cl.
CPC ............ *H04W 60/04* (2013.01); *G06N 3/044* (2023.01); *G06N 3/045* (2023.01); *G06N 3/084* (2013.01); *H04W 64/003* (2013.01)

(58) Field of Classification Search
CPC .... H04W 60/04; H04W 64/003; G06N 3/045; G06N 3/044; G06N 3/084
See application file for complete search history.

(56) References Cited

U.S. PATENT DOCUMENTS

| 10,200,236 | B1 | 2/2019 | Lewis |
| 10,200,454 | B1 | 2/2019 | Lewis |
| 10,412,080 | B1 | 9/2019 | Edwards |
| 10,621,839 | B2 * | 4/2020 | Vazirani ................. G08B 7/066 |
| 2016/0110833 | A1 | 4/2016 | Fix |

(Continued)

FOREIGN PATENT DOCUMENTS

| EP | 3703396 A1 * | 9/2020 | ............... H04B 7/26 |
| JP | 2011097461 A * | 5/2011 | |

(Continued)

OTHER PUBLICATIONS

"A surprising way to cut real estate costs", JLL, Sep. 25, 2016, 5 pages, <https://www.us.jll.com/en/trends-and-insights/workplace/a-surprising-way-to-cut-real-estate-costs>.

(Continued)

*Primary Examiner* — Khai M Nguyen
(74) *Attorney, Agent, or Firm* — Randy Tejeda

(57) ABSTRACT

One or more computer processors detect an unregistered device associated with an identified location, wherein the unregistered device is associated with wireless behavior. The one or more computer processors identify one or more registered devices in a proximity to the identified location and the detected unregistered device. The one or more computer processors identify an occupant associated with the detected unregistered device utilizing a trained device identification model, the identified location, and respective wireless behavior associated with the detected unregistered device and the identified one or more registered devices.

20 Claims, 4 Drawing Sheets

(56) References Cited

U.S. PATENT DOCUMENTS

| | | |
|---|---|---|
| 2017/0337116 A1 | 11/2017 | Negara |
| 2019/0197072 A1 | 6/2019 | Raman |
| 2020/0006975 A1* | 1/2020 | Vaughn .................... H02J 7/02 |
| 2020/0077257 A1 | 3/2020 | Ekambaram |
| 2020/0107086 A1 | 4/2020 | Choueiter |

FOREIGN PATENT DOCUMENTS

| | | | |
|---|---|---|---|
| JP | 2020161854 A * | 10/2020 | ............. H04L 41/12 |
| WO | WO-2020049342 A1 * | 3/2020 | |

OTHER PUBLICATIONS

"Rifiniti is now part of Workplace Analytics by FM:Systems", © 2020 FM:Systems, 4 pages, <https://fmsystems.com/acq/rifiniti-is-now-fm-systems/>.

Apthorpe et al., "A Smart Home is No Castle: Privacy Vulnerabilities of Encrypted IoT Traffic", arXiv:1705.06805v1 [cs.CR] May 18, 2017, 6 pages.

Atkinson, John S, "Your WiFi is Leaking—Determining User Behaviour Despite Encryption,", 2011, 1 page.

Kuriz et al., "Fingerprinting Mobile Devices Using Personalized Configurations", Proceedings on Privacy Enhancing Technologies 2016, 16 pages.

Li et al. "Wi-Motion: A Robust Human Activity Recognition Using WiFi Signals", IEEE Access, date of publication Oct. 17, 2019, DOI 10.1109/ACCESS.2019.2948102, 13 pages.

Patents Act 1977: Search Report under Section 17, Reference: DP/P49975GB, Application No. GB2116845.5, May 19, 2022, 4 pages.

\* cited by examiner

IDENTIFYING UNREGISTERED DEVICES THROUGH WIRELESS BEHAVIOR

BACKGROUND

The present invention relates generally to the field of wireless networking, and more particularly to identifying unregistered devices.

Wireless communication is the electromagnetic transfer of information between two or more points (e.g., wireless network devices) that are not connected by an electrical conductor. The most common wireless technologies use radio waves. With radio waves, intended distances can be short, such as a few millimeters for low-power methods (e.g., near-field-communication (NFC)) or as far as millions of kilometers for deep-space radio communications. It encompasses various types of fixed, mobile, and portable applications, including two-way radios, cellular telephones, personal digital assistants (PDAs), and wireless networking.

An integrated workplace management system (IWMS) is a software platform that helps organizations optimize the use of workplace resources, including the management of a company's real estate portfolio, infrastructure and facilities assets. IWMS solutions are commonly packaged as a fully integrated suite or as individual modules that can be scaled over time.

SUMMARY

Embodiments of the present invention disclose a computer-implemented method, a computer program product, and a system. The computer-implemented method includes one or more computer processers detecting an unregistered device associated with an identified location, wherein the unregistered device is associated with wireless behavior. The one or more computer processers identify one or more registered devices in a proximity to the identified location and the detected unregistered device. The one or more computer processors identify an occupant associated with the detected unregistered device utilizing a trained device identification model, the identified location, and respective wireless behavior associated with the detected unregistered device and the identified one or more registered devices.

DETAILED DESCRIPTION

Figure 1:
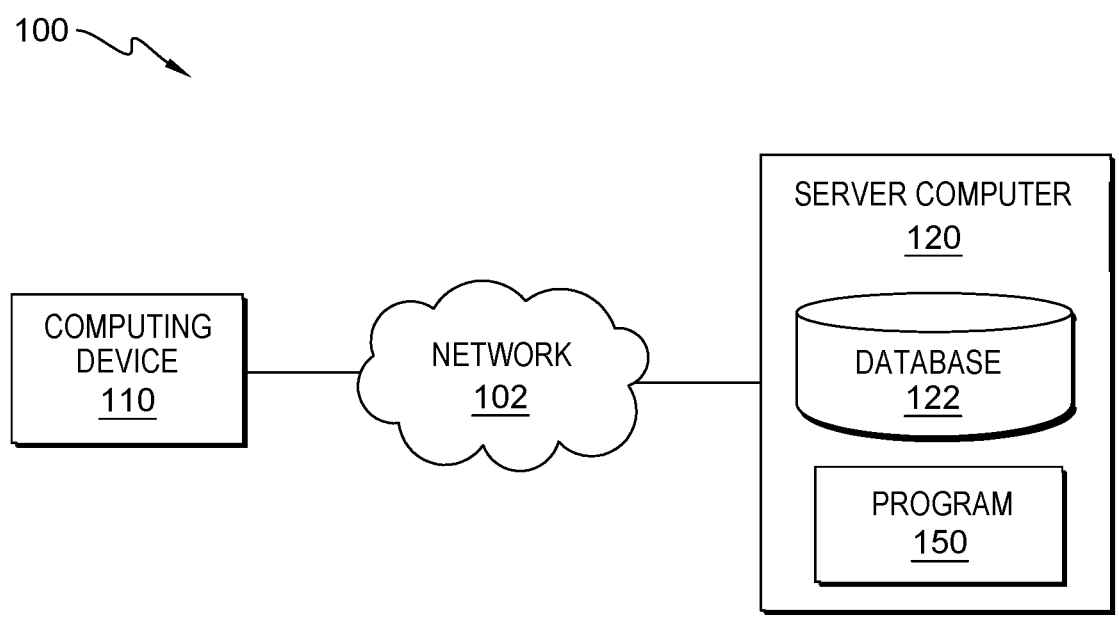
FIG. 1 is a functional block diagram illustrating a data processing environment, in accordance with an embodiment of the present invention.

Many organizations and companies rent, own, and/or manage vast quantities of office space distributed across the world. These office spaces are, typically, utilized daily by a plurality of employees, visitors, and clients, where the identity of each individual in the plurality may not be known. Managing these quantities of office space can be a prohibitively expensive task as a company or organization continues to grow, expand, and hire employees and, in turn, adjust office space to host said employees. Typically, companies or organizations utilize occupancy monitoring associated with one or more locations to assist in decision making processes for office space management such as lease extensions, space expansion or reduction, etc. While many enterprise management tools exist, these tools require significant engineering support, are cost prohibitive to scale and implement systems that accurately detect and distinguish on-site individuals for occupancy monitoring purposes. Furthermore, existing enterprise management tools struggle to incorporate existing wireless systems. These tools continue to struggle due to increased adoption of individuals carrying and utilizing a plurality of computing devices in office spaces, especially in bring-your-own-device (BYOD) workspaces where many devices are not registered to an enterprise directory. Improvements in the field can yield significant cost savings, for example, an exemplary company with over 78 million square feet of managed office space can potentially save over $400 million dollars a year with a 25% reduction to managed office space.

Embodiments of the present invention recognize that device identification is improved through an ubiquitous wireless infrastructure for the collection of associated wireless behavior (i.e., characteristics of a computing device as it travels through a specified geographical area and interacts with devices therein) and applied machine learning. Embodiments of the present invention leverage existing wireless infrastructure to eliminate the initial capital cost of an IoT deployment for device identification. Embodiments of the present invention recognize that identification of unregistered devices is improved through learned wireless behavior utilizing concurrent wireless behavior of unregistered and registered devices. Embodiments of the present invention determine a category (visitor vs. employee) associated with an unknown device and associated occupant. Embodiments of the present invention automatically enroll one or more unregistered devices associated with an identified employee to an enterprise directory. Embodiments of the present invention utilize the improved device identification for office space optimization, lease accounting, energy management and maintenance. Embodiments of the present invention improve occupancy monitoring by reducing potential double counting through primary device determination and prioritization. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.). In an embodiment, network 102 is comprised of a plurality of distributed access points in an enclosed geographical area. In this embodiment, each access point in the plurality of distributed access points contained metadata describing the respective access point such as country code, campus location identifier, sensor description (e.g., access point, router, motion sensor, peer-to-peer devices, etc.), building identifier, floor level, room identifier, generalized location (e.g., geolocation, coordinates, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, a smart watch, or any programmable electronic device capable of wirelessly communicating with network 102. In other embodiments, computing device 110 may represent a server computing system utilizing multiple computers as a server system, such as in a cloud computing environment. In an embodiment, computing device 110 may represent a plurality of computing devices, where each computing device is associated with a respective occupant (i.e., individual or plurality of individuals collocated in wireless communication with one or more controlled wireless network devices) and a registration status (i.e., unregistered or registered). In general, computing device 110 is representative of any electronic device or combination of electronic devices capable of executing machine readable program instructions as described in greater detail with regard to FIG. 4, in accordance with embodiments of the present invention.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 (e.g., enterprise directory) stores data used by program 150, such as building blueprints, floor layouts, historical occupancy insights, historical occupancy traffic patterns, employee records, lease agreements, historical registered devices, historical unregistered devices, and respective associated wireless behavior. In this embodiment, wireless behavior associated with a computing device includes, but are not limited to, identifying information (e.g., UUID, MAC address, occupant information, etc.), hardware specifications, bandwidth metrics, associated protocols (e.g., encryption, wireless, communication, etc.), duration of time that the computing device maintained a connection to one or more wireless network devices in an area, identified locations, interactions (e.g., pings, transmissions, authentications, connections, communications, transfers, etc.) with one or more devices in a proximity, and security protocols/measures. In yet another embodiment, database 122 includes contract documentation, conditions, clauses, options, and financial transactions that satisfy regulatory requirements in lease accounting and allocations.

In an embodiment, database 122 includes a corpus contains a plurality of training data, data structures, and/or variables used to fit the parameters of a device identification model. The training data comprises of pairs of input vectors with associated output vectors. For example, training data contains an input vector representing an employee with a plurality of associated computing devices with respective wireless behavior paired with an occupancy label (e.g., visitor, employee, employee title, etc.). In an embodiment, the corpus may contain one or more sets containing one or more instances of unclassified or classified (e.g., labelled) data, hereinafter referred to as training statements. In another embodiment, the training data contains an array of training statements organized in labelled training sets. In an embodiment, the corpus is categorized, organized, and/or structured in relation to a specific location, floor, occupancy goal (e.g., count the number of active employees at a location), etc. For example, all historical identified devices and generated occupancy insights related to a location are structured together. In various embodiments, the corpus is temporally structured. For example, the corpus is constrained or limited with regards to a temporal period (e.g., devices that have been observed in the last month).

Program 150 is a program for identifying unregistered wireless devices through associated wireless characteristics. In an embodiment, program 150 is an integrated workplace management system (IWMS). In another embodiment, program 150 is a module in a central IWMS. In various embodiments, program 150 may implement the following steps: detect an unregistered device associated with an identified location, wherein the unregistered device is associated with wireless behavior; identify one or more registered devices in a proximity to the identified location and the detected unregistered device; and identify an occupant associated with the detected unregistered device utilizing a trained device identification model, the identified location, and respective wireless behavior associated with the detected unregistered device and the identified one or more registered devices. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other registered computing device (not depicted) within computational environment 100. Program 150 is depicted and described in further detail with respect to FIG. 2.

The present invention may contain various accessible data sources, such as database 122, that may include personal storage devices, data, content, or information the user (e.g., occupant) wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
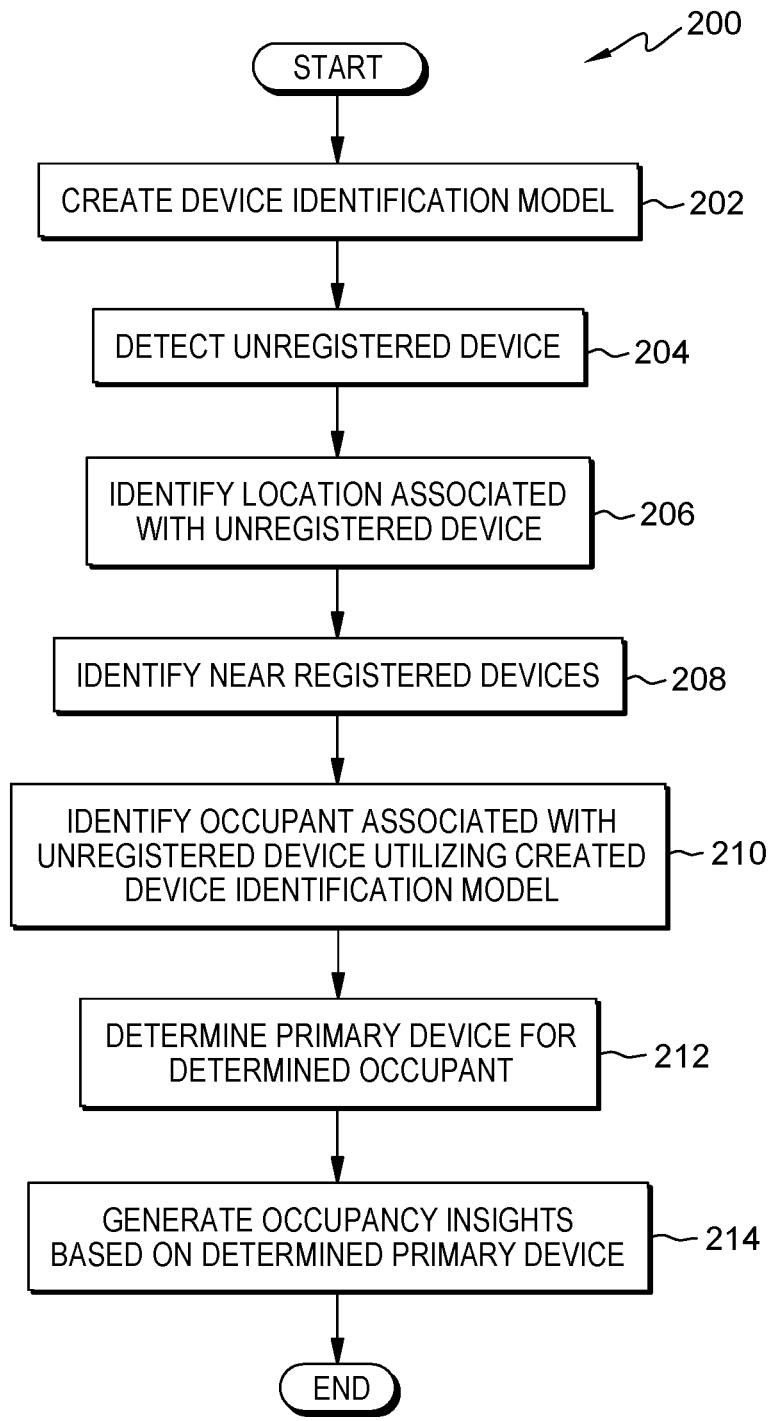
FIG. 2 is a flowchart depicting operational steps of a program, on a server computer within the data processing environment of FIG. 1, for identifying unregistered wireless devices through associated wireless characteristics, in accordance with an embodiment of the present invention.

FIG. 2 depicts flowchart 200 illustrating operational steps of program 150 for identifying unregistered wireless devices through associated wireless characteristics, in accordance with an embodiment of the present invention.

Program 150 creates a device identification model (step 202). In an embodiment, program 150 initiates responsive to an administrative request or a provided device identification model. In an embodiment, the device identification model is representative of a model utilizing deep learning techniques to train, calculate weights, ingest inputs, and output a plurality of solution vectors, wherein solution vectors include one or more probabilities associated with one or more occupant predictions. In an embodiment, the device identification model utilizes one or more transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In an embodiment, the device identification model is a recurrent neural network (RNN) trained utilizing supervised training methods utilizing the corpus contained in database 122 in order to learn device (i.e., registered and unregistered) patterns and associate said patterns with a plurality of devices (e.g., related wireless behavior), for example, a plurality of devices that join the same access point repeatedly over a small temporal margin.

Program 150 detects an unregistered device (step 204). In an embodiment, program 150 detects an unregistered device by monitoring a plurality of known wireless devices such as an access point. In this embodiment, program 150 continuously monitors and collects wireless behavior from the unregistered device such as UUID, MAC address, and identifying information associated device registration information contained in database 122. For example, as an occupant walks into an office building, an associated occupant smartwatch initiates a connection with the office wireless network and program 150 retrieves an associated MAC address from the occupant smartwatch, attempting to match the retrieved MAC address to a registered device in an enterprise directory. In this embodiment, as the unregistered device moves through the environment, program 150 continuously collects wireless behavior. In another embodiment, registered devices contain an authentication certificate that is utilized to immediately identify said devices. In an embodiment, program 150 utilizes historical wireless interactions with said computing devices or similar computing devices to determine the capabilities of detected and unregistered computing devices. In another embodiment, program 150 retrieves additional information regarding the detected device such as signal strength, timestamp, and duration of connectivity.

Program 150 identifies a location associated with the unregistered device (step 206). In an embodiment, program 150 identifies the location associated with the detected unregistered device by retrieving location information from the wireless network device that detected the unregistered computing device. For example, program 150 queries the access point that detected the unregistered computing device for location information and utilizing the location information and signal strength information from the unregistered computing device, program 150 predicts the location of the unregistered device, for example, as a generalized radius (e.g., service radius of the access point) around the access point. In other embodiments, program 150 may utilize signal triangulation between multiple wireless network devices to determine the location of the unregistered device. In a further embodiment, program 150 associates a corresponding floorplan or digital blueprint with the identified location.

Program 150 identifies a near registered device (step 208). Responsive to identifying the location of the unregistered device, program 150 identifies one or more near (e.g., 5 feet) registered devices. In an embodiment, program 150 queries all registered devices in proximity to the identified location of the unregistered device, where the proximity is a threshold radius or distance between device locations. In another embodiment, program 150 leverages NFC and/or global positioning service (GPS) to identify near registered devices. In a further embodiment, program 150 adjusts the threshold radius based on the identified quantity of near registered devices. For example, program 150 reduces the threshold radius pursuant to a large amount of near registered devices. In this example, program 150 reduces the threshold radius to identify potentially significant (i.e., unregistered device is associated with the user of the registered devices) registered devices. In a further embodiment, program 150 retrieves historical wireless behavior associated with the one or more identified registered devices. In addition, program 150 stores the predicted distance between the unregistered device and one or more registered devices and the duration of close proximity (e.g., one meter) to the one or more identified near registered devices. In a further embodiment, program 150 continuously and/or periodically identifies near registered devices as the unregistered device moves throughout the environment (e.g., office building).

Program 150 identifies an occupant associated with the unregistered device utilizing the created device identification model (step 210). In an embodiment, program 150 ingests the wireless behavior collected from the detected unregistered device and from one or more near registered devices, associated location information, and historical occupancy information into the created device identification model, as described in step 202. In this embodiment, program 150 utilizes the created device identification model to assign component weights to wireless behavior and generate a plurality of probabilities (e.g., numerical representation of predicted identities) calculated from all the weights respectively associated with a plurality of registered occupants. In this embodiment, the created device identification model generates one or more probabilities representing a plurality of occupant identification confidence values. For example, based on ingested information (e.g., the unregistered device maintained a two meter distance from a plurality of registered devices for an entire occupancy duration), program 150 predicts that the user of the unregistered device is associated with the registered user of a plurality of related registered devices. Responsive to program 150 failing to identify the occupant associated with the unregistered device, for example, based on occupant identification confidence values not reaching a predetermined confidence threshold, program 150 tags the unregistered device as a visiting occupant and continues to monitor the unregistered device.

Program 150 determines a primary device for the determined occupant (step 212). Responsive to program 150 identifying the occupant associated with the unregistered device, program 150 registers and/or associated the device with the identified occupant. In a further embodiment, program 150 determines a primary device from the plurality of registered devices to represent the associated user in subsequent occupancy calculations. In this embodiment, program 150 only utilizes the primary device of an occupant to determine all occupancy calculations, ignoring all other registered devices associated with the occupant in subsequent occupancy calculations. In an embodiment, program 150 utilizes associated wireless behavior for each registered device associated with the identified occupant to determine the registered device that accurately track occupant movement. For example, if a particular registered device is associated with consistent usage (e.g., 99% utilization rate while in the environment), such as a smartwatch or a mobile device, then program 150 utilizes said device as the primary device. In an embodiment, program 150 determines a respective primary device for every registered occupant in a plurality of collocated registered occupants. In another embodiment, program 150 utilizes relative signal strength or battery duration to determine the primary device. For example, program 150 determines that the registered device with the greatest historical signal strength is the primary device for the determined occupant. In an embodiment, program 150 only collects subsequent wireless behavior associated with the primary device for the occupant. In another embodiment, program 150 discards collected wireless behavior for every registered device that is not the primary device. In another embodiment, program 150 reclassifies the primary device and selects a new primary from a plurality of registered devices based on continuously collected wireless behavior, occupant removal of the primary device, or replacement of the primary device.

Program 150 generates occupancy insights based on the determined primary device (step 214). In an embodiment, program 150 utilizes each respective determined primary device for a plurality of registered occupants to calculate and generate a plurality of accurate occupancy insights, information, and metrics for a location, such as occupancy density, occupant traffic patterns, occupancy duration at one or more sublocations (e.g., rooms in an office building), most common sublocations, etc. In an example, program 150 collects wireless behavior, over a temporal period, from the determined primary device associated with every employee in a specific office building. In this example, program 150 aggregates the information contained in the collected employee device location information and associates the information with physical specifications (e.g., floor layouts) corresponding with the office building. Here, program 150 generates a plurality of insights regarding employee occupancy corresponding to the physical specifications. Generated insights provide an awareness of the occupancy of a building, floor, or site. In another embodiment, program 150 generates 2D or 3D floorplans with generated insights overlaid. For example, program 150 overlays density graphs over a 2D floorplan to represent average occupants in a ten-minute period specific to a respective sublocation.

In various embodiments, program 150 strips any personal identifiable information (PII) from all information collected, provided, or utilized (e.g., wireless behaviors, generated insights, etc.). For example, one or more registered devices are associated with a unique identifier and an occupant classification with no retained PII. In a further embodiment, program 150 utilizes the generated insights to determine utilization of one or more workspaces across a diverse portfolio of locations and offices to prioritize targeted lease renewals, adjust space opportunity, identify consolidation opportunities, analyze space needs by business unit, and analyze space needs by identified occupant classification. These embodiments assist to manage and consolidate leases to reduce costs and analyze associated financial impacts. In another embodiment, program 150 utilizes the generated insights to perform predictive analytics on future space forecasting, utilization trends, and space driving rate of return. In a further embodiment, program 150 transmits or presents the generated occupancy insights to one or more users, where program 150 utilizes a display (not depicted) associated with a computing device to present. In another embodiment, program 150 generates a document containing the generated occupancy insights.

In an embodiment, program 150 dynamically adjusts workspace requirements (e.g., required work-points (i.e., office seats)) of a company or organization through the improved occupancy counting and generated insights. In another embodiment, program 150 utilizes the improved occupancy monitoring for office space optimization, lease accounting, energy management and maintenance. For example, based on the generated insights, program 150 reduces lighting brightness in one or more rooms (i.e., sublocation) that do not have active employees after a particular hour.

Figure 3:
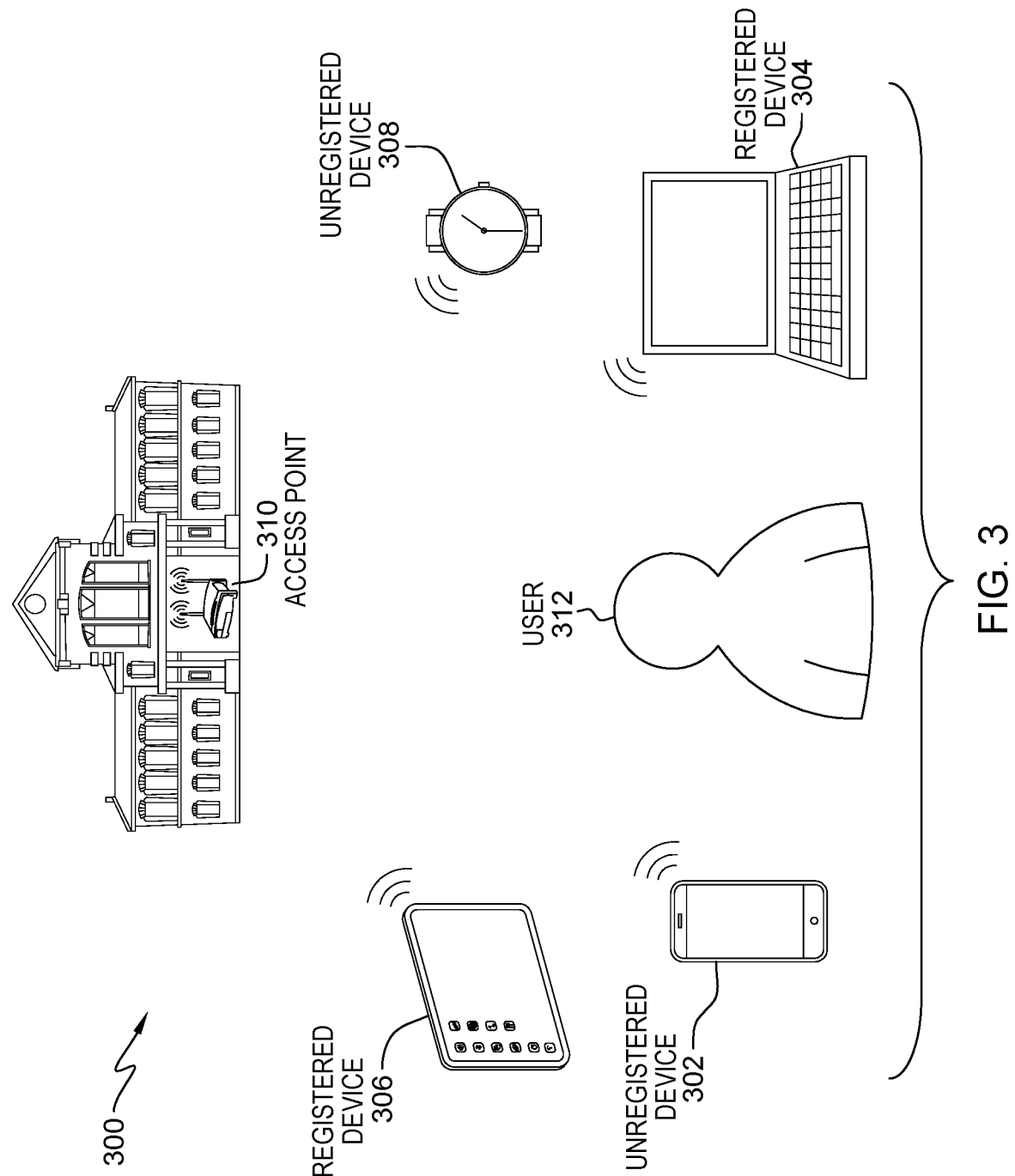
FIG. 3 illustrates an exemplary embodiment of the operational steps of the program within the data processing environment of FIG. 1, in accordance with an embodiment of the present invention.

FIG. 3 depicts exemplary embodiment 300, in accordance with an illustrative embodiment of the present invention. In exemplary embodiment 300, user 312 is an employee that works at a downtown location. The company that employs user 312 also promotes a bring-your-own-device culture. User 312 purchases unregistered device 302, a mobile phone, and unregistered device 308, a smartwatch, and intends to utilize said devices at work. User 312 already utilizes registered device 304, a tablet, and registered device 306, a laptop, at work. As user 312 enters the downtown location, user 312 passes access point 310. Program 150 utilizes access point 310 to detect unregistered device 302 and unregistered device 308 responsive to said devices attempting a connection. Program 150 also identifies registered device 304 and registered device 306 as near registered devices in a close proximity to the unregistered devices. Program 150 collects wireless behavior associated with the unregistered devices and ingests the collected wireless behavior into a device identification model trained to associate the unregistered devices to an employee with a high level of confidence. Program 150 determines that the unregistered devices are associated with user 312 and registers said devices into an enterprise directory. Responsively, program 150 selects registered device 304 as the primary device representing user 312 for subsequent occupancy insight generation.

Figure 4:
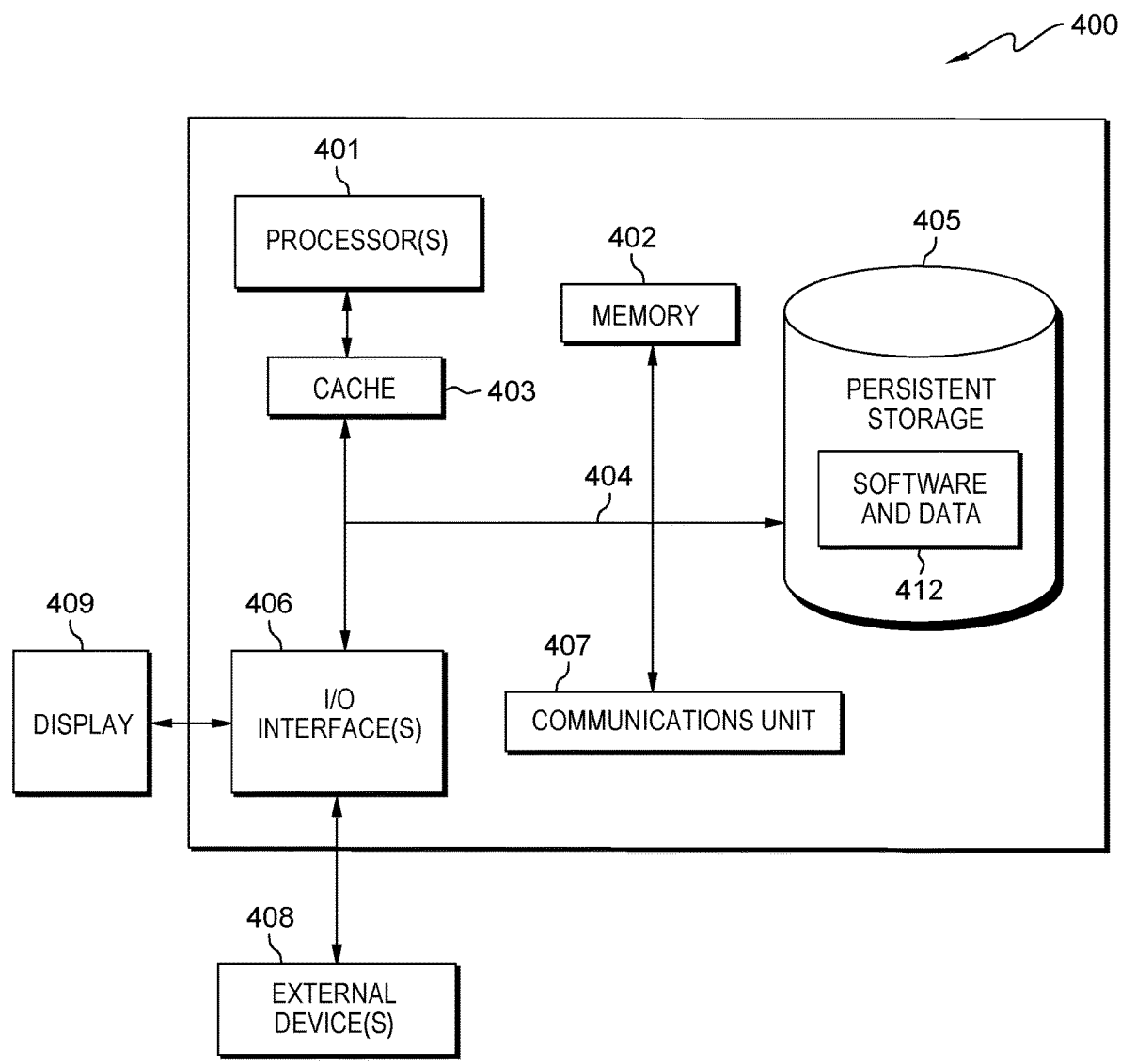
FIG. 4 is a block diagram of components of the server computer and a computing device, in accordance with an embodiment of the present invention.

FIG. 4 depicts block diagram 400 illustrating components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected, respectively, to computing device 110 and server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   detecting, by one or more computer processors, an unregistered device associated with an identified location and wireless behavior;
   identifying one or more registered devices in a proximity to the identified location and the detected unregistered device;
   identifying an occupant of the identified location associated with the detected unregistered device utilizing a trained device identification model, the identified location, and respective wireless behavior associated with the detected unregistered device and the identified one or more registered devices; and
   determining a primary device from a plurality of registered devices associated with the identified occupant for tracking occupant movement.

2. The computer-implemented method of claim 1, wherein the primary device represents the occupant in occupancy calculations.

3. The computer-implemented method of claim 2, further comprising:
continuously collecting wireless behavior for the determined primary device for each occupant in a plurality of occupants associated with the identified location.

4. The computer-implemented method of claim 3, further comprising:
generating occupancy insights based on the collected wireless behavior for each occupant in the plurality of occupants associated with the identified location.

5. The computer-implemented method of claim 4, further comprising:
adjusting lighting in one or more sublocations utilizing the generated occupancy insights.

6. The computer-implemented method of claim 1, wherein wireless behavior is characteristics of a device traveling through the identified and interacting with other devices.

7. The computer-implemented method of claim 1, the trained device identification model is a recurrent neural network.

8. A computer program product comprising:
one or more computer readable storage media and program instructions stored on the one or more computer readable storage media, the stored program instructions comprising:
program instructions to detecting an unregistered device associated with an identified location, wherein the unregistered device is associated with wireless behavior;
program instructions to identifying one or more registered devices in a proximity to the identified location and the detected unregistered device;
program instructions to identifying an occupant associated with the detected unregistered device utilizing a trained device identification model, the identified location, and respective wireless behavior associated with the detected unregistered device and the identified one or more registered devices; and
program instructions to determine a primary device from a plurality of registered devices associated with the identified occupant for tracking occupant movement.

9. The computer program product of claim 8, wherein the primary device represents the occupant in occupancy calculations.

10. The computer program product of claim 9, wherein the program instructions, stored on the one or more computer readable storage media, further comprise:
program instructions to continuously collect wireless behavior for the determined primary device for each occupant in a plurality of occupants associated with the identified location.

11. The computer program product of claim 10, wherein the program instructions, stored on the one or more computer readable storage media, further comprise:
program instructions to generate occupancy insights based on the collected wireless behavior for each occupant in the plurality of occupants associated with the identified location.

12. The computer program product of claim 11, wherein the program instructions, stored on the one or more computer readable storage media, further comprise:
program instructions to adjust lighting in one or more sublocations utilizing the generated occupancy insights.

13. The computer program product of claim 8, wherein wireless behavior is characteristics of a device traveling through the identified and interacting with other devices.

14. The computer program product of claim 8, the trained device identification model is a recurrent neural network.

15. A computer system comprising:
one or more computer processors;
one or more computer readable storage media; and
program instructions stored on the computer readable storage media for execution by at least one of the one or more processors, the stored program instructions comprising:
program instructions to detecting an unregistered device associated with an identified location, wherein the unregistered device is associated with wireless behavior;
program instructions to identifying one or more registered devices in a proximity to the identified location and the detected unregistered device;
program instructions to identifying an occupant associated with the detected unregistered device utilizing a trained device identification model, the identified location, and respective wireless behavior associated with the detected unregistered device and the identified one or more registered devices; and
program instructions to determine a primary device from a plurality of registered devices associated with the identified occupant for tracking occupant movement.

16. The computer system of claim 15, wherein the primary device represents the occupant in occupancy calculations.

17. The computer system of claim 16, wherein the program instructions, stored on the one or more computer readable storage media, further comprise:
program instructions to continuously collect wireless behavior for the determined primary device for each occupant in a plurality of occupants associated with the identified location.

18. The computer system of claim 17, wherein the program instructions, stored on the one or more computer readable storage media, further comprise:
program instructions to generate occupancy insights based on the collected wireless behavior for each occupant in the plurality of occupants associated with the identified location.

19. The computer system of claim 15, wherein wireless behavior is characteristics of a device traveling through the identified and interacting with other devices.

20. The computer system of claim 15, the trained device identification model is a recurrent neural network.

\* \* \* \* \*